May 4, 1926.
C. J. MANKEL
WEED CUTTER
Filed June 14, 1923
1,583,063
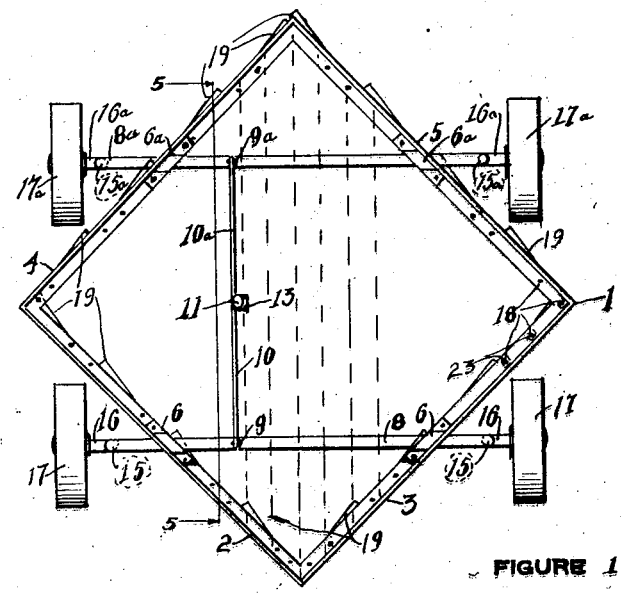
FIGURE 1
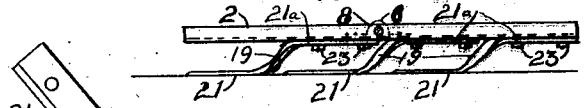
FIGURE 2
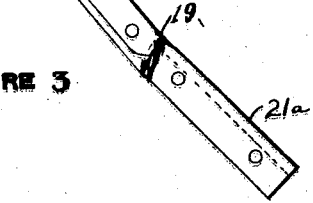
FIGURE 3
FIGURE 4
FIGURE 6
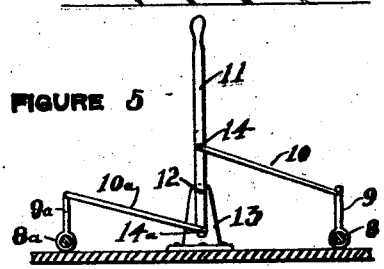
FIGURE 5
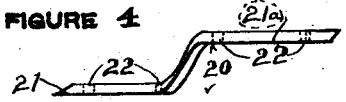
INVENTOR
Charles J. Mankel
John A. Naismith
BY
ATTORNEY Patented May 4, 1926.

1,583,063

UNITED STATES PATENT OFFICE.

CHARLES J. MANKEL, OF NEAR SAN JOSE, CALIFORNIA.

WEED CUTTER.

Application filed June 14, 1923. Serial No. 645,330.

*To all whom it may concern:*

Be it known that I, CHARLES J. MANKEL, a citizen of the United States, and residing near San Jose, in the county of Santa Clara and State of California, have invented certain new and useful Improvements in Weed Cutters, of which the following is a specification.

It is one object of my invention to provide a weed cutter in which the knives are simultaneously adjustable in a vertical plane whereby to vary their spacing from the ground level.

It is another object of the invention to provide a device in which each knife is reversible, its two ends being identical in form and size but the cutting edges facing in opposite directions.

It is still another object of my invention to provide a weed cutter having a frame of such a form as to accommodate a given number of knives arranged to cut a clean swath over a surface of the full width of the frame.

Finally it is an object of the invention to provide a weed cutter wherein the frame and knives are so formed as to permit the mounting of a knife upon any one of the sides of the frame, one cutting edge of the knife being presented in an operable position when mounted upon one side of the frame and the other cutting edge being presented in an operable position when the knife is mounted upon either of the two adjoining sides.

In the drawing:—

Figure 1 is a plan view of the device.

Figure 2 is a side elevation of one side of the frame.

Figure 3 is a plan view of one knife.

Figure 4 is a front elevation of the part shown in Figure 3.

Figure 5 is a detail elevation on line 5—5 of Figure 1.

Figure 6 shows another embodiment of my invention.

Referring more particularly to the drawing, 1 indicates a square frame made of angle iron, its four sides being indicated by numerals 2—3—4 and 5.

Mounted in bearings 6—6 and 6ª—6ª are shafts 8 and 8ª, each shaft carrying an upwardly extending arm as 9—9ª having links 10—10ª pivotally connected thereto. At 11 is a hand lever pivotally mounted at 12 on a bearing 13 and having links 10—10ª pivotally connected thereto as at 14—14ª being equally spaced above and below the pivotal point 12 of hand lever 11.

Each shaft 8—8ª has a portion as 15—15ª extending at right angles thereto at each end thereof, and a bearing portion 16—16ª formed thereon at right angles to said portions 15—15ª as shown. Upon each of the bearings 16—16ª is mounted a wheel 17—17—17ª—17ª. It is obvious that a movement of handle 11 in one direction will spread the two pairs of wheels apart thereby lowering the frame, and a movement of the lever in the opposite direction will draw the two pairs of wheels together thereby raising the frame. The frame is perforated at 18 to receive bolts for mounting the knives now to be described.

Each knife 19 is formed of a single piece of metal offset as at 20 to bring the two cutting edges 21—21ª into different horizontal planes, and twisted as shown in order to secure the desired shear of the said cutting edges. Orifices as 22 are formed in knives 19 spaced the same on each end thereof as the orifices in frame 1 whereby either end of the knife may be secured to frame 1 by bolts as 23.

The knives are mounted on frame 1 as shown in Figure 1, it being noted that the cutting edges of the rearmost knives on sides 4 and 5 engage and cut the weeds that pass between the cutting edges of the knives on the foremost ends of sides 2 and 3. Likewise the cutting edges of the rearmost knives on sides 2 and 3 cut the weeds to the extreme edge of the frame so that in once passing over the ground the device will cut a clean swath, the vertical adjustment enabling the operator to cut close to the ground and yet raise the frame over obstructions.

A particular advantage of this construction is, that when the knife blades become worn they may be reversed and remounted with new cutting edges in position. This is a simple operation since any knife on side 2, for instance, when reversed may be mounted on either side 3 or 4; merely moving it to side 5 will not permit its reversal and consequently the presentation of a new cutting edge.

By means of the construction herein set forth it is clear that I have provided a device that can be operated for a long time by merely changing the positions of the knives, its effective life (before sharpening of the knives becomes necessary) being double that of a device where the knives can not be interchanged.

In Figure 6 I show that the device may be quickly turned into a cultivator by merely removing the knives and replacing them with cultivator teeth 24.

It is to be understood, of course, that while I have herein shown and described one specific embodiment of my invention, changes in form, construction, and method of operation may be made within the scope of the appended claim.

I claim:—

A weed cutter comprising a frame mounted to move in a horizontal plane, and a plurality of knives removably mounted thereon, each knife having two end portions offset a distance from each other and lying in substantially parallel planes and a connecting central portion, each end portion having one of its longer and outer edges sharpened to a cutting edge, the two cutting edges being oppositely directed, and said end portions being angularly arranged with relation to each other.

CHARLES J. MANKEL.